United States Patent [19]

Pietsch et al.

[11] 4,395,141

[45] Jul. 26, 1983

[54] BEARING AND SEAL ASSEMBLY FOR STERN TUBES OF VESSELS

[75] Inventors: Günter Pietsch; Gerhard Walter; Günter Mewes, all of Hamburg; Gert Schrader, Rosengarten, all of Fed. Rep. of Germany

[73] Assignee: Howaldtswerke Deutsche Werft Aktiengesellschaft Hamburg und Kiel, Hamburg, Fed. Rep. of Germany

[21] Appl. No.: 365,586

[22] Filed: Apr. 5, 1982

[30] Foreign Application Priority Data

Apr. 13, 1981 [DE] Fed. Rep. of Germany ....... 3114494
Sep. 26, 1981 [DE] Fed. Rep. of Germany ....... 3138413

[51] Int. Cl.³ .......................... F16C 33/74; F16J 15/40
[52] U.S. Cl. ...................................... 384/147; 384/132; 308/DIG. 12; 277/3; 440/112
[58] Field of Search ............... 308/DIG. 12; 384/130, 384/131, 132, 139, 140, 143, 147, 400, 401, 398; 440/112; 277/3, 27, 153, 152, 15, 59

[56] References Cited

U.S. PATENT DOCUMENTS

| | | | |
|---|---|---|---|
| 3,088,744 | 5/1963 | Ezekiel et al. | 277/3 |
| 3,375,014 | 3/1968 | Chubb et al. | 277/3 |
| 3,415,581 | 12/1968 | Seubert | 384/131 |
| 3,726,531 | 4/1973 | Pagan et al. | 440/112 X |
| 3,934,952 | 2/1976 | Gardner | 308/DIG. 12 X |
| 3,936,057 | 2/1976 | Walter et al. | 277/59 |
| 4,085,941 | 4/1978 | Wilkinson et al. | 277/3 |

FOREIGN PATENT DOCUMENTS

858371 3/1952 Fed. Rep. of Germany .

Primary Examiner—Stuart S. Levy
Assistant Examiner—Thomas R. Hannon
Attorney, Agent, or Firm—Jon M. Lewis

[57] ABSTRACT

A stern tube bearing for vessels is sealed off in a leakproof aft seal assembly which comprises at least one annular chamber between axially spaced sealing elements. The annular chamber is filled with a liquid for lubricating the sealing elements. The liquid is circulated in a circulation system through a separating tank. The head of the circulated liquid is lower than the head of a lubricant in the stern tube bearing which again is lower than the lowest possible head of the sea-water surrounding the aft seal assembly. Any sea-water or dirt entering into the annular chamber will be removed out of it by the circulated liquid and separated from it in the separating tank which can be provided with devices for supervising the circulation system. A forward seal assembly of the stern tube bearing may be included in the circulation system. The connecting pipes run in such a way that in case of any fault or interruption in the circulation system the annular chambers cannot become empty so that the sealing elements remain lubricated.

7 Claims, 6 Drawing Figures

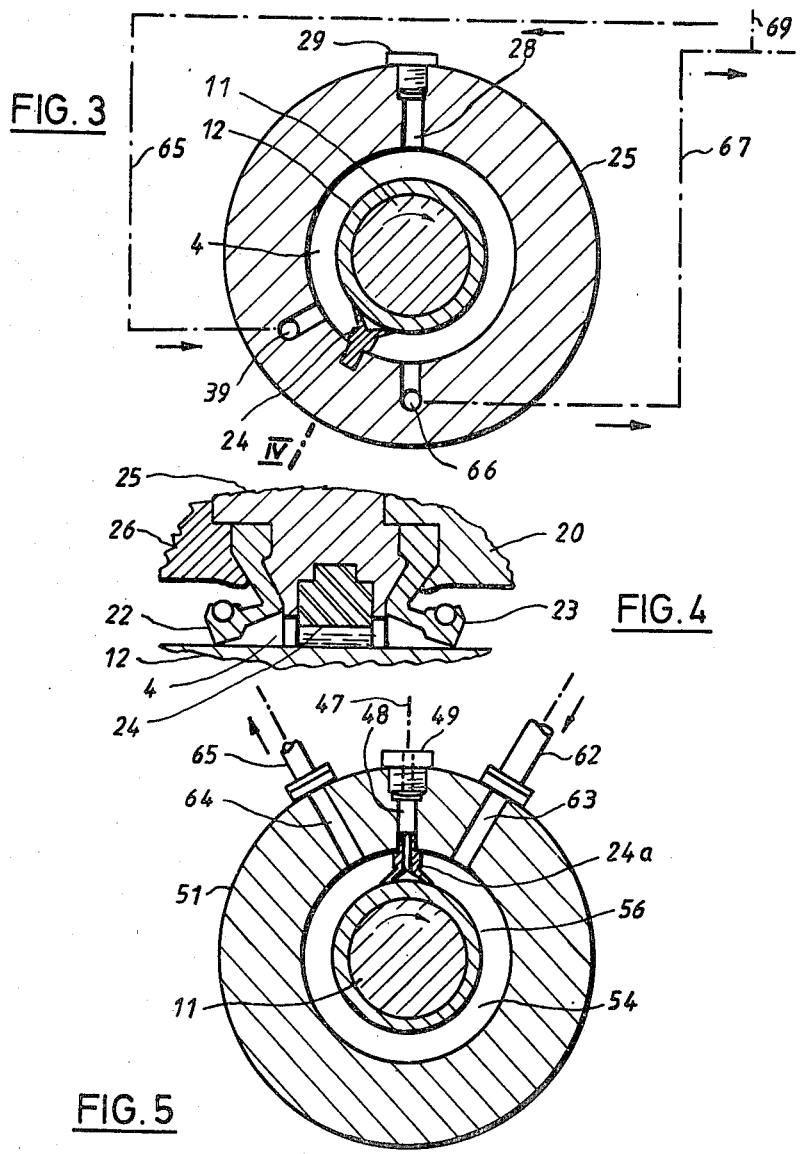

BEARING AND SEAL ASSEMBLY FOR STERN TUBES OF VESSELS

BACKGROUND OF THE INVENTION

The invention relates to improvements in bearing and sealing assemblies for the stern tubes of vessels, by which assemblies leaking of oil from the bearing into the sea-water and the ingress of sea-water into the bearing are prevented and in which a lubrication system for the sealing assembly improves the safety of the seal and lengthens the life of the sealing elements.

DESCRIPTION OF PRIOR ART

In many cases the pressure of the oil in the stern tube bearing is higher than the head of the surrounding sea-water so that no water can enter the bearing. However, if the sealing elements are no longer unobjectionable, there is some danger that oil from the stern tube bearing or from the sealing assembly leaks into the sea-water. Usually the sealing assemblies sealing off the stern tube comprise some lip seals defining annular chambers, at least one of which being filled with oil to lubricate the lip seals.

It has already been proposed to provide an annular air space between an outboard water seal and an oil seal at the aft end of the bearing. The air space has a drain through which water leaking in through the water seal can flow into the bilge. The disadvantage of this sealing assembly is that the sealing elements are not lubricated on the sides showing to the air space and therefore heavy wear and damages may occur.

SUMMARY OF THE INVENTION

It is an object of the present invention to provide an improved sealing system for a leak tight stern tube sealing in which the sealing elements are always sufficiently lubricated by a liquid, in which by selection of pressure of liquids in neighbouring spaces neither sea-water nor oil can migrate through an annular chamber and in which the lubricating liquid is continuously circulated, cooled, separated, controlled and supervised.

In accordance with the present invention in a bearing and seal assembly for the stern tubes of vessels there is a circulation system for a liquid lubricating the sealing elements spaced apart axially and defining an annular chamber, in which circulation system the pressure of the liquid is lower than the head of the lubricating oil in the stern tube bearing and also lower than the head of the surrounding sea-water, and which circulation system comprises a separating means by which other liquids or dirt which can enter the annular chamber are separated from the circulated liquid and in which the circulation system is supervised. As the pressure in an annular chamber of an aft stern tube seal is lower than in neighbouring spaces it is safe that sea-water or oil from the bearing cannot leave the annular chamber at the other side but only with the liquid to the separating means, which usually will be a separating tank. The pressure in the circulation system can be induced by a pressure or gravity tank being positioned somewhat higher than the stern tube. If possible one tank can be used, the lower part of which being made as a separating tank and the upper part of which being so high that the level of the liquid determines the pressure in the annular chamber of the seal assembly.

As a liquid in the annular chamber behind the aft end of the stern tube oil may be used. This oil can be different from the lubricant for the stern tube bearing. However the oil should not form an emulsion with water, so that separation of oil and water can easily be achieved in the separating tank.

A pumping means for circulating the liquid is preferably positioned within the annular chamber. A pumping means which is advantageous for the present invention is formed by the flow of the liquid in the annular chamber because of the rotation of the shaft respectively a bush on the shaft and a deflector element which narrows the annular chamber (as is described in U.S. Pat. No. 3,936,057). The deflector element causes a local increase of pressure in the annular chamber which is sufficient to force a part of the liquid via a pipe into the separating tank. While the velocity of the flow of the liquid in the separating tank is low to achieve a good separation of oil, water and contaninants, the deflector element in the annular chamber causes a whirl by which dead particles of oil and other dirt are removed from and cooled, purified liquid is led to the sealing edges of the sealing elements. The deflector element induces in the annular chamber a hydrodynamic pressure by which also liquids of low viscosity such as sea-water are forced to the separating tank.

In a preferred embodiment there are two circulation systems for different liquids lubricating sealing elements of an aft seal assembly. One annular chamber near the aft end of the stern tube bearing contains oil as the circulated liquid. Another annular chamber near the aft end of the aft seal assembly contains purified water as the circulated liquid. Should one of the liquids leak into the annular chamber of the other liquid it will be carried off with the other liquid and separated from it in the separating tank.

According to another preferred embodiment a circulation system for a liquid in an outboard aft assembly includes also an inner forward seal assembly of the stern tube bearing. In the forward seal assembly there is a forward annular chamber defined by sealing elements spaced axially and containing a liquid lubricating the sealing elements. In the circulation system the liquid is first led into the forward annular chamber at normal operation. There is a pumping means for effecting circulation. From the forward annular chamber the liquid flows via a pipe into an aft annular chamber of the aft seal assembly. There is another pumping means which forces the liquid inclusive dirt, dead lubricant abrasive parts from the sealing elements etc. via another pipe to the separating tank. The pumping means in the forward and in the aft annular chamber are deflector elements as described before. In the case that one of the deflector elements should become ineffective the other one will maintain a sufficient circulation. It is possible to mount in each of the annular chambers more than one deflector element with passages leading into and out of the annular chambers to increase the circulation of the liquid. As in this embodiment at least two pumping means are arranged in consecutive order the deflector elements are advantageous because they are not sealing off the cross-section of the annular chambers.

Including the forward seal assembly in a circulation system for the aft seal assembly results in better cooling of the forward sealing elements because a larger quantity of liquid is available. Furthermore fresh purified lubricating liquid is continuously led to the sealing elements, and the pressure difference at the sealing elements on both the ends of the stern tube bearing is the same.

For improving the security the pipes leading the liquid into and out of the annular chambers run in a way rising up to such a height that at any interruption of the circulation system so much of the liquid remains in the annular chambers that the shaft respectively the bush mounted to the shaft can immerge in the liquid and distribute by rotation of the shaft some liquid over the circumference of the sealing elements for lubrication. In the oil as liquid containing annular chamber of the aft seal assembly the exit is preferably below so that dirt and water collecting in the lower part of the annular chamber can be displaced by the circulation of the liquid. In this case the deflector element is positioned in the lower half of the annular chamber and with respect to the main direction of rotation of the shaft behind the exit leading out of the annular chamber.

BRIEF DESCRIPTION OF THE DRAWINGS

FIG. 3 is a radial sectional diagrammatic view along section III—III of FIG. 2 of an annular chamber of an aft seal assembly.

FIG. 4 is an enlarged longitudinal partial view according to IV of FIG. 3 of an annular chamber.

FIG. 5 is a radial sectional diagrammatic view along V—V in FIG. 2 of an annular chamber of a forward seal assembly.

DESCRIPTION OF PREFERRED EMBODIMENTS

Figure 1:
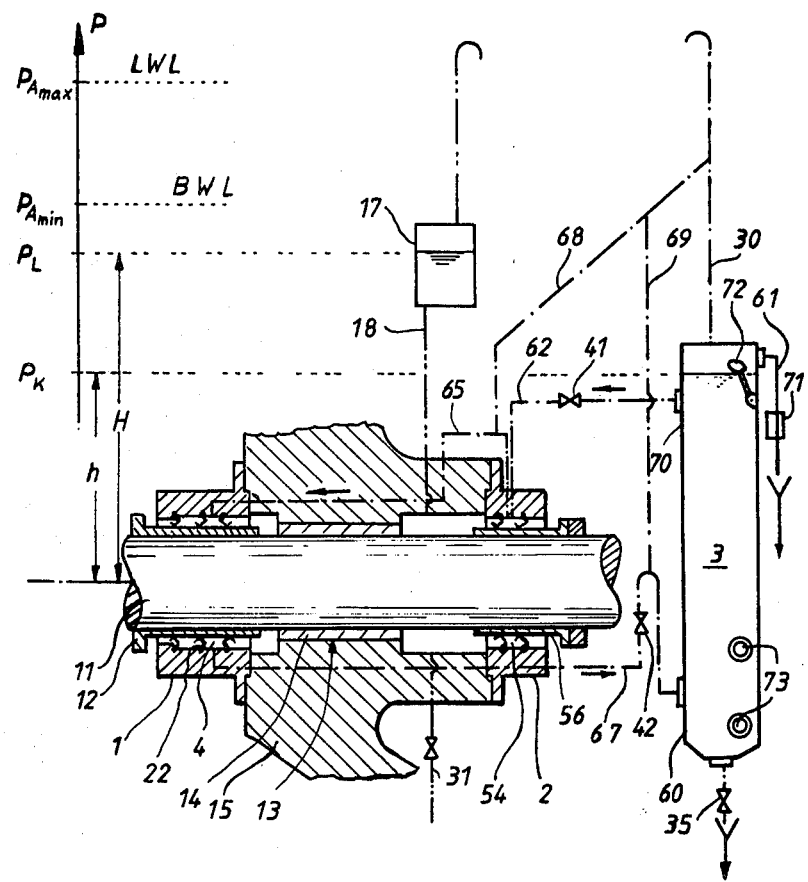
FIG. 1 is a longitudinal sectional diagrammatic view of a stern tube bearing with an aft and a forward seal assembly and shows diagrammatically a circulation system leading a liquid through the annular chambers and back to a tank and further lubricating means for the bearing, and signifies the pressures of the liquids in the bearing and the seal assemblies.

According to FIG. 1 the propeller shaft 11 of a vessel is borne in the stern tube bushing 14 of the stern tube bearing 13 in the stern boss 15. A lubricant such as oil is led to the stern tube bearing 13 from a gravity tank 17 via pipes 18. A pipe 31 may be provided for letting the lubricant out of the stern tube bearing 13. The lubricant may also be continuously returned by a pump (not shown) to the gravity tank 17.

At the outboard end of the stern tube bearing 13 there is an aft seal assembly 1. In the aft seal assembly 1 a bush 12 is mounted to the shaft 11. Sealing elements which are preferably lip seals, are in contact with the bush 12. At least one pair of axially spaced sealing elements define an annular chamber 4 which contains a liquid for lubricating the sealing elements. If the liquid is oil the lip seal 22 at the aft end of the annular chamber 4 separates water and oil in the assembly.

At the inner end of the stern tube bearing there is a forward seal assembly 2 comprising another pair of sealing elements axially spaced to form a forward annular chamber 54. The sealing elements are in contact with a forward bush 56 mounted to the shaft 11. Also the forward annular chamber 54 contains a liquid for lubricating the sealing elements.

Figure 2:
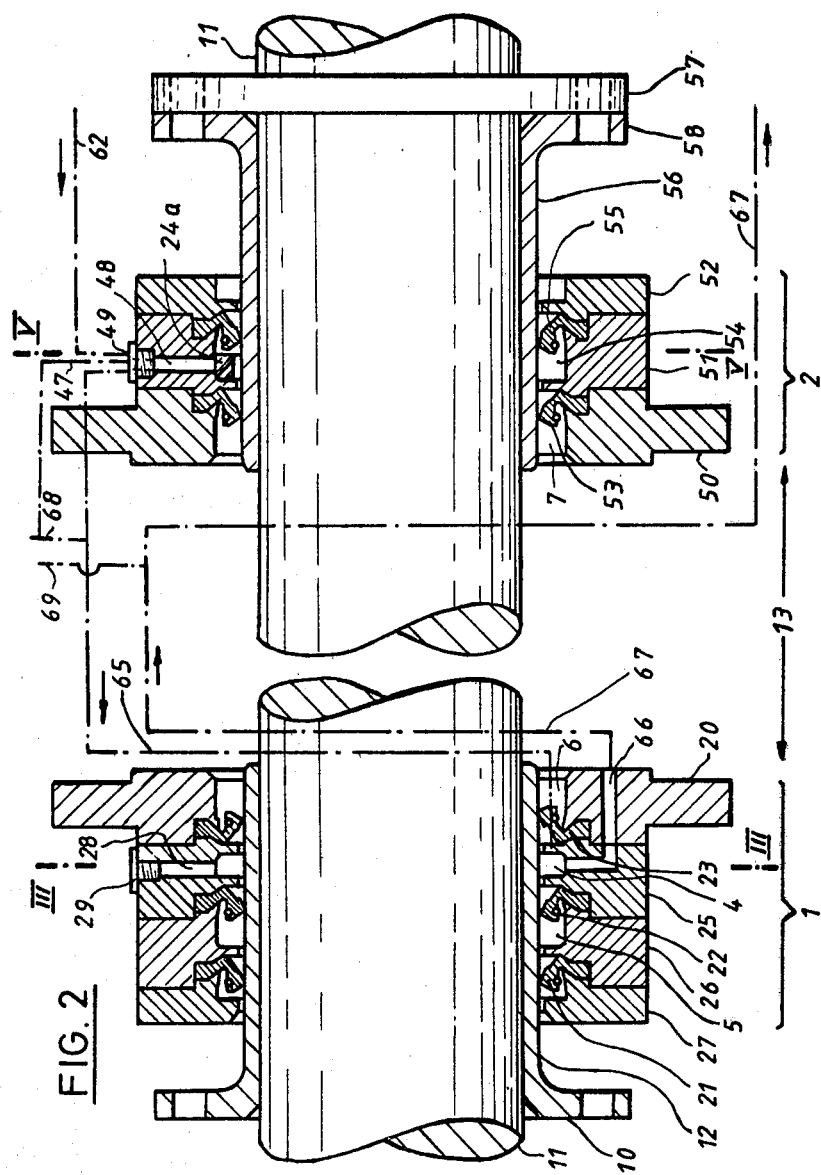
FIG. 2 is an enlarged longitudinal sectional view of the forward and aft seal assemblies according to FIG. 1.

Further details of the seal assemblies 1 and 2 are described later in connection with FIG. 2.

In FIG. 1 a circulating system for the liquid to and from the annular chambers is shown diagrammatically. From the upper part 70 of a tank 3 in which the level of the liquid defines the head of the liquid in the annular chambers, the liquid flows through a valve 41 via a pipe 62 into the forward annular chamber 54, is circumferentially led through said chamber, flows further via a pipe 65 into the aft annular chamber 4 and is returned via a pipe 67 and a valve 42 into a separating tank 60 which is the lower part of the tank 3. The tank 3 is open to the atmosphere via a venting pipe 30. From the highest points of the pipes 65 and 67 venting pipes 68,69 commence and are connected to venting pipe 30. In the lower part 60 of tank 3 there are means for coalescing of oil and for separating oil and water which means are not shown and are well-known in the art. From the lower part 60 water and dirt can be drawn out by a drain valve 35. At the upper part 70 of tank 3 which works like a gravity tank, there is an overflow pipe 61. If the level of the liquid rises, e.g. by ingress of lubricant from the stern tube bearing or by ingress of sea-water into an annular chamber, the liquid can flow over so that the head of the circulation system cannot increase over an approved head.

There are some controlling and supervising means on the tank 3 for the circulation system. There is a flow indicator 71 in overflow pipe 61 to give an alarm signal if the tank 3 flows over. A float switch 72 controls the level of the liquid and gives an alarm signal if the level becomes lower than the exit to pipe 62 or higher than the exit to overflow pipe 61. The vertical distance between the exits of pipes 61 and 62 should at least be so great that changes of the volume of the liquid because of warming should not effect overflow of the liquid. In the lower part 60 inspection glasses 73 permit to recognize whether water has separated and is to be drained out via drain valve 35. The control of the circulating liquid allows to check the seal assemblies continuously because any alteration of the volume or of the composition of the liquid shows that the sealing elements are deteriorated.

In FIG. 1 the relations of the heads of the different liquids in the seal assemblies are shown. The head $P_A$ of the outboard sea-water surrounding the aft seal assembly fluctuates between $P_A$ max for a loaded ship and $P_A$ min for an empty ship at ballast trip, which is pointed out by the load waterline LWL and the ballast waterline BWL. The head $P_K$ of the liquid in the annular chambers 4,54 should in any case be lower than $P_A$ min and is induced by the level in tank 3. The head $P_L$ of the lubricant in the stern tube bearing 13 should be higher than the head $P_K$. If lip seals are used the pressure difference between the head $P_K$ in the annular chambers in about the height of the axis of the stern tube and the head $P_L$ of the lubricant in the stern tube bearing should correspond to the head of an oil column of a height of 2 m to 4 m, preferably of 3 m ($=26,4 \times 10^3$ Pascal). In FIG. 1 the head $P_K$ corresponds to the static height h of the liquid in the circulation system, and the head $P_L$ of the lubricant corresponding to the static height H should not be higher than the lowest head $P_A$ min of the outboard sea-water. If instead of the lip seal 22 a slide ring or face seal is used, the head $P_K$ in the annular chambers 4,54 should in any case be lower than $P_L$ and $P_A$ min. According to FIG. 2 the aft seal assembly 1 comprises a fastening flange 20 and ring parts 25,26,27. Flange 20 is to be screwed to the outboard side of the stern boss 15. Parts 20,25,26,27 are mounted together by screws (not shown) and thereby enclose lip seals 21,22,23. The aft lip seal 21 seals off a water chamber or prechamber 5 usually filled with sea-water the head of which is about the head of the surrounding sea-water. Lip seal 21 is intended to prevent ingress of sand, dirt, abrasive particles etc. Lip seals 22 and 23 define the annular chamber 4. Before lip seal 23 there is an annular sapce 6 which belongs to the stern tube bearing 13. The lips of the lip seals 21,22,23 contact the bush 12 mounted to the propeller shaft 11. There is a flange 10 on the bush 12 for fastening to the propeller which is not shown.

In the annular chamber 4 there is the liquid for lubricating the lip seals which liquid e.g. is a sort of oil. The liquid flows—as can be seen also in FIG. 3—through pipe 65 and a passage 39 into and circumferentially through the annular chamber 4. There is a deflector element 24 which causes by rotation of the shaft a small local increase of the pressure and a deflection of the liquid which herewith is forced into a passage 66 and the pipe 67. The deflector element 24 functions as a pumping means for causing the circulation of the liquid in the circulation system. The deflector element 24 is e.g. y-shaped and consists preferably of a resilient material. At least one arm of it is flexibly pressed against bush 12. In axial direction there are distances from the lip seals 22,23, so that some of the liquid flowing in the annular chamber 4 can pass aside the deflector element. In the embodiment shown in FIGS. 2 and 3 the exit passage 66 out of annular chamber 4 commences below to remove water with the circulated liquid. The deflector element 24 is therefore arranged in the lower half of the annular chamber 4. Above on the annular chamber 4 there is a radial channel 28 with a plug 29 for first filling the annular chamber 4 after mounting the seal assembly 1. It is possible to provide a venting pipe (not shown) to remove air collecting in the upper part of the annular chamber 4.

As the lead $P_K$ of the liquid in the annular chamber 4 is lower than in the neighbouring prechamber 5 and the space 6 the lips of the lip seals 22 and 23 are directed into the neighbouring spaces so that they are pressed against the bush 12 by the higher pressures in these spaces.

The arrows in the figures show the direction of flow in the circulation system at the direction of rotation of the propeller shaft at forward motion of the vessel. If at going astern the shaft should rotate in opposite direction the liquid will be circulated reverse which transient change is of no harm.

The forward seal assembly 2 comprises a fastening flange 50, a ring 51 and a lid ring 52 between which the lip seals 53 and 55 are enclosed, which define the forward annular chamber 54 for the liquid lubricating the lip seals 53,55. In the forward seal assembly 2 the shaft 11 is surrounded by a bush 56, a flange 58 of which is fastened to a ring 57 mounted to the shaft 11. A space 7 belongs to the stern tube bearing 13 and contains the lubricant of the head $P_L$. The liquid in the annular chamber 54 has the lower head $P_K$ of the circulation system. As is also shown in FIG. 5 the liquid flows via pipe 62 and a channel 63 into the annular chamber 54, passes it circumferentially and is forced by a deflector element 24a into a channel 64 and further through pipe 65 to the aft seal assembly 1. Shape and function of the deflector element 24a are the same as described before for the deflector element 24. Suitably the deflector element 24a and the channels 63,64 are arranged in the upper part of annular chamber 54. After mounting the forward seal assembly 2 the annular chamber 54 can be filled via a radial passage 48 which can be closed off by a plug 49. The passage 48 can be continued by a venting pipe 47 which may be connected to e.g. the venting pipe 68.

The pipes 62,65,67 run in such a height with respect to the annular chambers 4,54 that said chambers even at any interruption of supply of liquid cannot become empty. The venting pipes 68,69 being positioned at the highest points of the pipes 68,69 effect that the liquid from the annular chambers cannot be sucked off e.g. by total emptying the tank 3. It is therefore possible to renew the liquid in the tank 3 while the shaft 11 rotates without interrupting the lubrication of the sealing elements.

Figure 6:
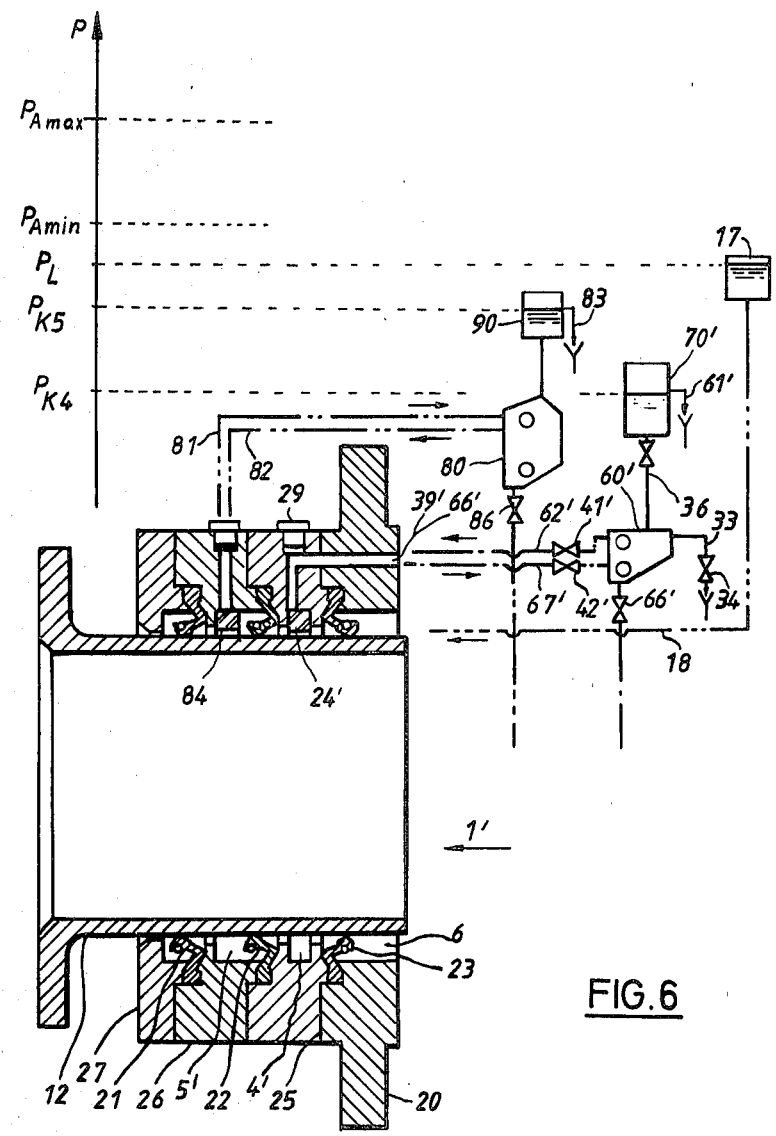
FIG. 6 is a longitudinal diagrammatic view of an aft seal assembly with two separate circulation systems each comprising an annular chamber, a tank inducing the head of the liquid in the annular chamber and a separating tank, and further showing the relevant pressure of the liquids.

FIG. 6 shows an aft seal assembly 1' comprising two separate circulation systems for this aft seal assembly only. The parts of the seal assembly are essentially the same as described before and the same reference numbers are used insofar and some are identified by an additional prime mark. In the annular chamber 4' there is a liquid such as oil flowing in a circulation system through a separating tank 60'. Another aft circulation system is provided for a different liquid such as purified water circulating through an annular prechamber 5'. The head PK in both the circulation systems may be different but in any case they are lower than the head $P_L$ of the lubricant in the stern tube bearing which again is lower than the lowest head $P_A$ min of the surrounding sea-water. Preferably the head $P_{K5}$ in the prechamber 5' is higher than the head $P_{K4}$ in the annular chamber 4'. Hereby safety against ingress of sea-water into the stern tube bearing and against exudation of oil is improved and lubrication and cooling of all the sealing elements 21,22,23 by liquids is always guarantied, and especially an optimal lubrication of sealing element 22 can be achieved.

In the annular chamber 4' a deflector element 24' and the channels 39' and 66' are positioned above so that a radial sectional view of the annular chamber 4' would be similar to the radial sectional view of a forward annular chamber according to FIG. 5.

In the example according to FIG. 6 the tank for the liquid for the annualr chamber 4' is separated in a gravity tank 70' and a separating tank 60' which are connected by a pipe 36. The deflector element 24' circulates the liquid from the separating tank 60' via pipe 62' into the annular chamber 4' and via pipe 67' back into tank 60'. Pipes 62' and 67' run above annular chamber 4' so that no venting pipes are necessary. Also separating tank 60' is positioned above annular chamber 4' so that the chamber 4' is the lowest point in this circulation system. At any fault in the circulation system the annular chamber 4' remains filled with the liquid so that the sealing elements cannot become dry. A test pipe 33 with a test valve 34 can be mounted on separating tank 60' to check whether the liquid contains water. On the gravity tank 70' an overflow pipe 61' and further control devices as described for FIG. 1 can be arranged. Pipes 62' and 67' can be closed by valves 41' and 42'. Via a drain valve 35' water and dirt can be removed from the separating tank 60'.

For the aft circulation system in which purified water may circulate a separating tank 80 is provided which is connected with the prechamber 5' via pipes 81,82. Inlet and outlet of prechamber 5' are located in the upper half of it and a deflector element 84 is positioned at about the highest point. The deflector element 84 causes the circulation of the water in the aft circulation system in which the head is induced by a gravity tank 90 which also may be united with the separating tank 80. An overflow 83 of gravity tank 80 limits the pressure $P_{K5}$ in the aft circulation system. By a drain valve 86 dirt can be removed from the separating tank 80. Pipes 81,82 run in such a hight with respect to the prechamber 5' that it cannot entirely become emptied.

By one or more of the circulation systems as described and by the relation of the heads of the liquids a sealing for a stern tube is achieved which prevents pollution of the sea-water, which is leaktight and which improves the safety for the stern tube bearing. Continuously feeding purified and cooled liquids into the annular chambers improves the lubrication of the sealing elements and thereby their reliable working life. A permanent supervising of quality and pressure of the circulated liquids and of the seal assemblies becomes possible.

What is claimed is:

1. In a bearing and seal assembly for stern tubes of vessels wherein there is a rotatable stern shaft and a bearing surrounding a portion of the stern shaft and wherein there is means for supplying oil under pressure to provide lubrication between said bearing and said portion of the stern shaft, and wherein there is an aft seal assembly surrounding said stern shaft at the outboard end of said bearing, and wherein said aft seal assembly contains two sealing elements spaced apart axially and an annular chamber defined by said sealing elements and means for applying a liquid lubricating the sealing elements into said annular chamber under pressure, the improvement comprising
   a gravity tank for a lubricant providing lubrication of the bearing, the gravity tank being arranged inside the vessel in a height to induce a head of the oil lower than the possible minimum of the head of the sea-water surrounding the aft seal assembly,
   a circulation system for the liquid in the annular chamber, which comprises a tank for said liquid, the tank being positioned inside the vessel in a height to induce a head of said liquid in said annular chamber lower than the head of the oil in the bearing,
   a separating tank for separating and purifying the liquid, a first pipe for said liquid connecting the upper part of the tank with the annular chamber,
   a second pipe for said liquid connecting the annular chamber with the separating tank, and
   pumping means for circulating said liquid from the tank through said first pipe, circumferentially through said annular chamber and through said second pipe to the separating tank which is connected with the tank inducing the head of the liquid in the circulation system.

2. A bearing and seal assembly as defined in claim 1 further comprising at the forward end of the stern tube a forward seal assembly containing two sealing elements spaced apart axially and a forward annular chamber defined by the sealing elements, the forward annular chamber being inserted in the first pipe for said liquid connecting the upper part of the tank with the annular chamber of the aft seal assembly so that said liquid circumferentially flows through the forward annular chamber.

3. A bearing and seal assembly as defined in claim 2 in which the means for circulating said liquid are a first stationary deflector element in the forward annular chamber and a second stationary deflector element in the annular chamber of the aft seal, said deflector elements being so shaped as to cause a whirl of said liquid and to cause a constriction of cross-sectional area for circumferential flow of liquid in the annular chamber, so as to cause circulation of said liquid through the connecting pipes.

4. A bearing and seal assembly as defined in claim 3 in which the deflector elements and the inlet and outlet passages in the annular chambers from and to the pipes are arranged in such a way that at the direction of rotation of the stern shaft at forward motion of the vessel said liquid is cause to circulate from the upper part of the tank through the annular chamber of the aft seal assembly and back to the separating tank.

5. A bearing and seal assembly as defined in claim 3 in which the pipe connecting the forward annular chamber with the annular chamber of the aft seal assembly and the pipe connecting the annular chamber of the aft seal assembly with the separating tank rise up to a level higher than the lowest point of the stern shaft in the annular chambers, and in which at the highest points of the pipes vent pipes commence.

6. A bearing and seal assembly as defined in claim 1 comprising two independent circulation systems for circulating different liquids through annular chambers of the aft seal assembly.

7. A bearing and seal assembly as defined in claim 1 in which the sealing elements are lip seals and the pressure difference between the head of the lubricant in the stern tube bearing and the head of the liquid in the annular chamber is that of an oil column of 2 to 4 m.

* * * * *